United States Patent
Frenkel et al.

(10) Patent No.: US 6,950,749 B2
(45) Date of Patent: Sep. 27, 2005

(54) METHOD FOR RESISTIVITY ANISOTROPY DETERMINATION IN NEAR VERTICAL WELLS

(75) Inventors: Michael A. Frenkel, Houston, TX (US); Ingo M. Geldmacher, Spring, TX (US)

(73) Assignee: Baker Hughes Incorporated, Houston, TX (US)

( * ) Notice: Subject to any disclaimer, the term of this patent is extended or adjusted under 35 U.S.C. 154(b) by 37 days.

(21) Appl. No.: 10/674,204

(22) Filed: Sep. 29, 2003

(65) Prior Publication Data

US 2004/0133351 A1 Jul. 8, 2004

Related U.S. Application Data

(60) Provisional application No. 60/414,174, filed on Sep. 27, 2002.

(51) Int. Cl.$^7$ .............................. G01V 3/18; G01V 3/10
(52) U.S. Cl. ............................................. 702/7; 324/339
(58) Field of Search ............................ 702/7; 324/339, 324/347, 375

(56) References Cited

U.S. PATENT DOCUMENTS

| | | | | |
|---|---|---|---|---|
| 3,697,864 A | * | 10/1972 | Runge | 324/368 |
| 3,808,520 A | * | 4/1974 | Runge | 324/343 |
| 4,319,192 A | * | 3/1982 | Chemali et al. | 324/375 |
| 5,452,761 A | | 9/1995 | Beard et al. | 166/250 |
| 5,870,690 A | * | 2/1999 | Frenkel et al. | 702/7 |
| 5,883,515 A | * | 3/1999 | Strack et al. | 324/339 |
| 5,889,729 A | | 3/1999 | Frenkel et al. | 367/73 |
| 5,966,013 A | * | 10/1999 | Hagiwara | 324/339 |
| 6,060,885 A | | 5/2000 | Tabarovsky et al. | 324/366 |
| 6,219,619 B1 | | 4/2001 | Xiao et al. | 702/7 |
| 6,308,136 B1 | * | 10/2001 | Tabarovsky et al. | 702/7 |
| 6,381,542 B1 | | 4/2002 | Zhang et al. | 702/7 |
| 6,385,545 B1 | * | 5/2002 | Wu | 702/10 |
| 6,442,488 B2 | | 8/2002 | Xiao et al. | 702/9 |
| 6,591,194 B1 | * | 7/2003 | Yu et al. | 702/7 |
| 6,618,676 B2 | * | 9/2003 | Kriegshauser et al. | 702/7 |
| 6,636,045 B2 | * | 10/2003 | Tabarovsky et al. | 324/343 |
| 6,760,666 B2 | * | 7/2004 | Hagiwara | 702/7 |

FOREIGN PATENT DOCUMENTS

| | | |
|---|---|---|
| GB | 2368915 A | 5/2002 |
| WO | WO95/03557 | 2/1995 |

OTHER PUBLICATIONS

Yang, Determining Resistivity Anisotropy by Joint Lateral and Induction Logs, Jun. 17–20, 2001, SPWLA 42nd Annual Logging Symposium.*

Watson et al., Differentiating Anisotropy and Lateral Effects Using Azimuthal Resistivity Offset Wenner Soundings, May–Jun. 1999, Geophysics, vol. 64, No. 3, pp. 739–745.*

Bonner et al., Resistivity While Drilling– Images from the String, Spring 1996, Oilfield Review, pp. 4–19.*

(Continued)

Primary Examiner—John Barlow
Assistant Examiner—Toan M. Le
(74) Attorney, Agent, or Firm—Madan, Mossman & Sriram, P.C.

(57) ABSTRACT

A method is disclosed for real-time (well-site) resistivity anisotropy determination using array lateral logs or any other unfocused, lateral-type measurements, and array induction logs or any other focused, induction-type measurements. Near-vertical wells with a deviation angle of less than 30 degrees are considered. Since with a lateral log, at each logging depth the injected current has both horizontal and vertical components, the data contains information related to both horizontal ($R_h$) and vertical ($R_v$) resistivities. With array induction tool, the induced current in near-vertical wells has only a horizontal component, and the induction data contain information related to $R_h$ only. Having those two data sets acquired in the same well, it is possible to instantly estimate the formation resistivity anisotropy using square of a ratio between borehole and invasion corrected lateral and induction focused logs.

29 Claims, 8 Drawing Sheets

OTHER PUBLICATIONS

Wei Yang, *Determining Resistivity Anisotropy By Joint Lateral and Induction Logs*, SPWLA 42nd Annual Logging Symposium, Jun. 17–20, 2001, pp. 1–5, 10 Figs.

K.S. Kunz et al.; *Some Effects of Formation Anisotropy on Resistivity Measurements in Boreholes*, Geophysics, V. 34, No. 4, Oct. pp. 770–794, 10 Figs.

Michael A. Frenkel et al.; *Real–time Estimation of Resistivity Anisotropy Using Array Lateral and Induction Logs*, OTC 15125, 2003 Offshore Technology Conference, Houston, Texas, May 5–8, 2003, pp. 1–6, 2 Figs.

Victor Rosato et al.; *Real Time Interpretation of MWD Anisotropy in High Angle Wells, Offshore Gulf of Mexico*, SPWLA 38th Annual Logging Symposium, Jun. 15–18, 1997, pp. 1–6, 8 Figs., 1 Table.

T. Hagiwara et al.; *Identifying and Quantifying Resistivity Anisotropy in Vertical Boreholes*, SPWLA 40th Annual Logging Symposium, May 30–Jun. 3, 1999, pp. 1–11, 13 Figs.,1 Table.

R. Griffiths et al.; *Optimal Evaluation of Formation Resistivities Using Array Induction and Array Laterolog Tools*, SPWLA 41st Annual Logging Symposium, Jun. 4–7, 2000, pp. 1–13, 23 Figs.

\* cited by examiner

METHOD FOR RESISTIVITY ANISOTROPY DETERMINATION IN NEAR VERTICAL WELLS

CROSS REFERENCES TO RELATED APPLICATIONS

This applications claims priority from Provisional U.S. Patent Application Ser. No. 60/414,174 filed on 27 Sep. 2002.

BACKGROUND OF THE INVENTION

1. Field of the Invention

The invention is directed to resistivity anisotropy interpretation systems and methods for well logging application and, in one particular aspect, to a data interpretation system and method that is usable to determine formation parameters and reservoir descriptions in real-time.

2. Description of the Related Art

The production of hydrocarbons from subsurface formations typically commences by forming a borehole through the earth to a subsurface reservoir thought to contain hydrocarbons. From the borehole, various physical, chemical, and mechanical properties are "logged" for the purpose of determining the nature and characteristics, including for example, the porosity, permeability, saturation, and depth of the subsurface formations encountered. One such logging technique commonly used in the industry is referred to as induction logging. Induction logging measures the conductivity or its inverse, the resistivity, of a formation. Formation conductivity is one possible indicator of the presence or absence of a significant accumulation of hydrocarbons, because, generally speaking, hydrocarbons are relatively poor conductors of electricity. On the other hand, formation water, which is typically salty, is a relatively good conductor of electricity. Thus, induction logging tools can obtain information that, properly interpreted, indicates the presence or absence of hydrocarbons.

These induction (also known as electromagnetic induction) well logging instruments were first introduced by Doll, H. G., "Introduction to Induction Logging and Application to Logging of Wells Drilled with Oil Based Mud", Journal of Petroleum Technology, vol. 1, pp.148–62, Society of Petroleum Engineers, Richardson Tex. (1949). Induction well logging instruments typically include a sonde having one or more transmitter coils and one or more receiver coils at axially spaced apart locations. Induction well logging instruments also typically include a source of alternating current (AC) which is conducted through the transmitter coils. The AC passing through the transmitter coils induces a magnetic field within the surrounding formations, causing a flow of eddy currents within the earth formations. In general, the magnitude of the eddy currents is proportional to the electrical conductivity (the inverse of the electrical resistivity) of the earth formations surrounding the instrument. The eddy currents, in turn, induce a magnetic field that is coupled to the one or more receiver coils, thereby inducing in the receiver coil(s) a voltage signal with magnitude and phase dependent upon the electrical characteristics of the adjacent formation.

Induction logging technology has evolved significantly since its introduction by Doll. In recent years, induction devices consisting of several complex coil combinations have been replaced by tools with multiple arrays. See, for example, Beard, D. R. et al., "Practical Applications of a New Multichannel and Fully Digital Spectrum Induction System, 1996 SPE Annual Technical Conference and Exhibition, Denver, Colo., SPE-36504, Oct. 6–9, 1996, pp. 99–109, which is referred to, for example, in U.S. Pat. No. 6,219,619 issued to Xiao et al. Each array consists of one transmitter and a pair of receiver coils. These new induction devices are commonly referred to as array-type induction tools.

The older style induction tools attempt to focus the tool response using carefully selected coil arrangements. The focusing therefore is fixed by the tool design, i.e. these tools are "hardware-focused". A hardware focusing method have been proposed by Moran and Chemali (see, for example, J. H. Moran and R. Chemali, 1985, "Focused resistivity logs", in *Developments in Geophysical Exploration Methods*, v.6, A. A. Fitch, ed., Applied Science Publishers, Ltd., London, p. 225–260). In the new array-type induction tools, the measurements from various arrays are combined through a software algorithm to achieve focusing of the signal response, i.e. these tools are "software-focused". This processing produces a set of curves with predetermined depth of investigation, and vertical resolution.

Using software-based focusing provides greater flexibility for handling various logging environments and for creating more reliable induction logs. However, the quality and accuracy of the final focused logs is dependent on the accuracy of the software focusing method. Current software focusing methods have been proposed by Barber (see T. D. Barber et al., "Using a Multiarray Induction Tool To Achieve High-Resolution Logs With Minimum Environmental Effects", 66$^{th}$ Annual Technical Conference and Exhibition of the Society of Petroleum Engineers, Dallas, Texas, SPE-22725, Oct. 6–9, 1991, pp. 637–651.) and by Zhou (see Zhou et al., "Numerical Focusing of Induction Logging Measurements", 12$^{th}$ Workshop in Electromagnetic Induction in Earth, International Union Geodesy and Geophysics, Aug. 8–14, 1994, Brest, France, p. 10.), are referred to, for example, in U.S. Pat. No. 6,219,619 issued to Xiao et al. The software focusing methods provide reliable estimates of the true formation resistivity, $R_t$ ($R_h$).

U.S. Pat. No. 5,452,761 to Beard et al., the contents of which are fully incorporated herein by reference, discloses an apparatus and method for digitally processing signals received by an induction logging tool comprising a transmitter and a plurality of receivers. The received voltages are digitized at a sampling rate well above the maximum frequency of interest. The digitizing window is synchronized to a cycle of the oscillating current signal. Corresponding samples obtained in each cycle are cumulatively summed over a large number of such cycles. The summed samples form a stacked signal. Stacked signals generated for corresponding receiver coils are transmitted to a computer for spectral analysis. Transmitting the stacked signals instead of all the individually sampled signals reduces the amount of data that needs to be stored or transmitted. A Fourier analysis is performed on the stacked signals to derive the amplitudes of in-phase and quadrature components of the receiver voltages at the frequencies of interest. From the component amplitudes, the conductivity of the formation can be accurately derived.

The effect of formation anisotropy on resistivity logging measurements have long been recognized. Kunz and Moran studied the anisotropic effect on the response of a conventional logging device in a borehole perpendicular to the bedding plane of a thick anisotropic bed. U.S. Pat. No. 6,219,619, issued to Xiao et al., discloses a method of software focusing for array-type induction logging tools using an inhomogeneous background formation model in a vertical well. Using this inhomogeneous background formation model, the formation response of the induction logging tool can be split into two portions: a background response, and a certain "response residue". The background response is obtained as computer simulated measurements of the inhomogeneous background model. The response residue is the difference between raw measurements and the background responses. Xiao '619 reduces nonlinearity effects and thereby improves the focusing method. The method of Xiao '619 requires a significant amount of processing time for forward modeling, data inversion, skin effect corrections, etc. This limits their effectiveness as a method for real-time analysis.

Another technique used in oil exploration and well logging is a lateral log. Lateral logging techniques are taught in Doll, H. G., "The Laterolog", Paper 3198, in Transactions of the AIME, v 192, p. 305–316, 1951, and in Doll, H. G., "The Microlaterolog", Paper 3492, in Transactions of the AIME, v 198, p. 17–32. Generally, the laterolog is an electrode device with multiple current electrodes configured in several different ways to produce several different responses. A current-emitting and current-return electrodes (A and B) are placed close together on the sonde, with a measure electrode (M) several feet away, and a measure return (N) far away. This arrangement is sensitive to the potential gradient between A and B. The Array Lateral Log technology of data measurements and interpretation is taught in Hakvoort et. al paper "Field Measurements and Inversion Results of the High-Definition Lateral Log", Paper C, in Transactions of the SPWLA, 1998.

U.S. Pat. No. 6,060,885, issued to Tabarovsky et al., discloses a differential array instrument and a method for determining selected parameters of an earth formation surrounding a borehole. The invention includes an instrument mandrel carrying a single source electrode for injecting an electrical current of a predetermined value into the formation surrounding the borehole, and an array of measurement electrodes uniformly and vertically spaced from the source electrode along the instrument mandrel. The uniformly and vertically spaced electrodes are adapted to derive first and second difference potentials between electrodes. The first and second difference potentials are derived in response to current from the source electrode traveling generally vertically in an orientation generally parallel to the axis of the borehole in the formation to successive ones of the predetermined groups of selected measuring electrodes. The plurality of first and second difference potentials may be correlated to a plurality of values representative of the selected formation parameters. The plurality of values representative of the selected formation parameters may provide a profile of the selected parameters over an increasing radial distance from the borehole. The lateral log is generally not designed for differentiating horizontal and vertical resistivities in a formation having resistivity anisotropy.

Typically, measured data needs to be corrected for effects of the borehole and of invasion. U.S. Pat. No. 6,381,542, issued to Zhang et al., the contents of which are incorporated herein by reference, discloses a method for real-time borehole correction of resistivity logging data. In the first stage, the entire range of possibilities of earth models relevant to borehole compensation is sampled and a suit of tool responses is generated, with and without the borehole. A wide range tool response including the borehole effects is input to a neural net and the neural net is trained to produce the corresponding borehole-free response. Once the neural net has been trained, in the second stage, the neural net is validated by using as input tool responses that were not used in the training of the neural net and comparing the output of the neural net to the corresponding borehole-free response. If the agreement is good, then the neural net has been validated and may be used to process subsequently acquired data that includes borehole effects. The borehole corrected measurements may be inverted using an additional neural net.

Typical resistivity methods use an inversion of the obtained data. Some improved methods for data inversion, including data obtained in anisotropic rock formations, are described in U.S. Pat. No. 5,889,729, issued to Frenkel et al.; in Hagiwara T. and Zea H., 1999, "Identifying and quantifying resistivity anisotropy in vertical boreholes", 40$^{th}$ Annual Logging Symposium, paper Z.; and in Griffiths R., Barber T., and Faivre O., 2000, "Optimal evaluation of formation resistivities using array induction and array laterolog tools", 41$^{st}$ Annual Logging Symposium, paper BBB. Frenkel et al. teaches a method for rapid, well-site inversion of resistivity logs. The paper by Hagiwara et al. teaches a method of identifying and estimating resistivity anisotropy in vertical holes. The method is derived from 2D modeling of electric- and induction-log responses. Resistivity anisotropy can be estimated preferably from the difference between these electric- and induction-log resistivity measurements. The paper of Griffiths et al. uses an improved information content of the array measurements, better defines borehole effects, and thus either flags or more accurately corrects data. The authors of Hagiwara et al. and Griffiths et al. suggest using the joint interpretation of focused, Dual Laterolog-type (DLL-type), galvanic logs and conventional array induction-type logs. However, since focused galvanic measurements are not very sensitive to changes of the formation resistivity in the vertical direction ($R_v$), the techniques offered in Hagiwara et al. and in Griffiths et al. cannot provide reliable anisotropy estimates.

Further methods of determining resistivity are outlined in Yang, 2001, "Determining resistivity anisotropy by joint lateral and induction logs", SPWLA 42$^{nd}$ Annual Logging Symposium, paper CC. Yang suggests a joint 2-D inversion of lateral and induction logs, however, this inversion process is time consuming and is not applicable for real-time conditions. Rosato and Beck (see Rosato V. and Beck J., 1997, "Real-time interpretation of MWD anisotropy in high angle wells, Offshore Gulf of Mexico", SPWLA 38$^{th}$ Annual Logging Symposium, paper T.) present a method of quick anisotropy determination using previously stored data tables, which include age, deposition environment, and anisotropy ratios at various dip angles. After deciding which well type lithologic boundaries and anisotropy ratios are expected, a pre-drill model can be constructed to assist in real-time interpretation of a high-angle well.

To correctly determine the anisotropy distribution around the borehole, one must apply time-consuming, inversion-type processing, which is only practical at data processing centers having sufficient computer power. There is a need for a real-time method of approximating the resistivity anisotropy at the well-site. The present invention satisfies this need.

SUMMARY OF THE INVENTION

The present invention is a method of determining an anisotropic resistivity parameter of an earth formation using measurements obtained with an unfocused differential array resistivity tool (lateral log) and measurements made with an induction logging tool without performing an inversion of said induction log. In a preferred embodiment of the invention, the induction measurements are obtained with a focused induction logging tool.

The processing includes applying borehole and invasion corrections on a point-by-point basis to the lateral log to give an estimate of a vertical resistivity and applying borehole and invasion corrections to the induction measurements to give an estimate of a horizontal resistivity.

BRIEF DESCRIPTION OF THE DRAWINGS

The present invention is best understood with reference to the following figures in which like numerals refer to like elements.

DETAILED DESCRIPTION OF THE INVENTION

Figure 1:
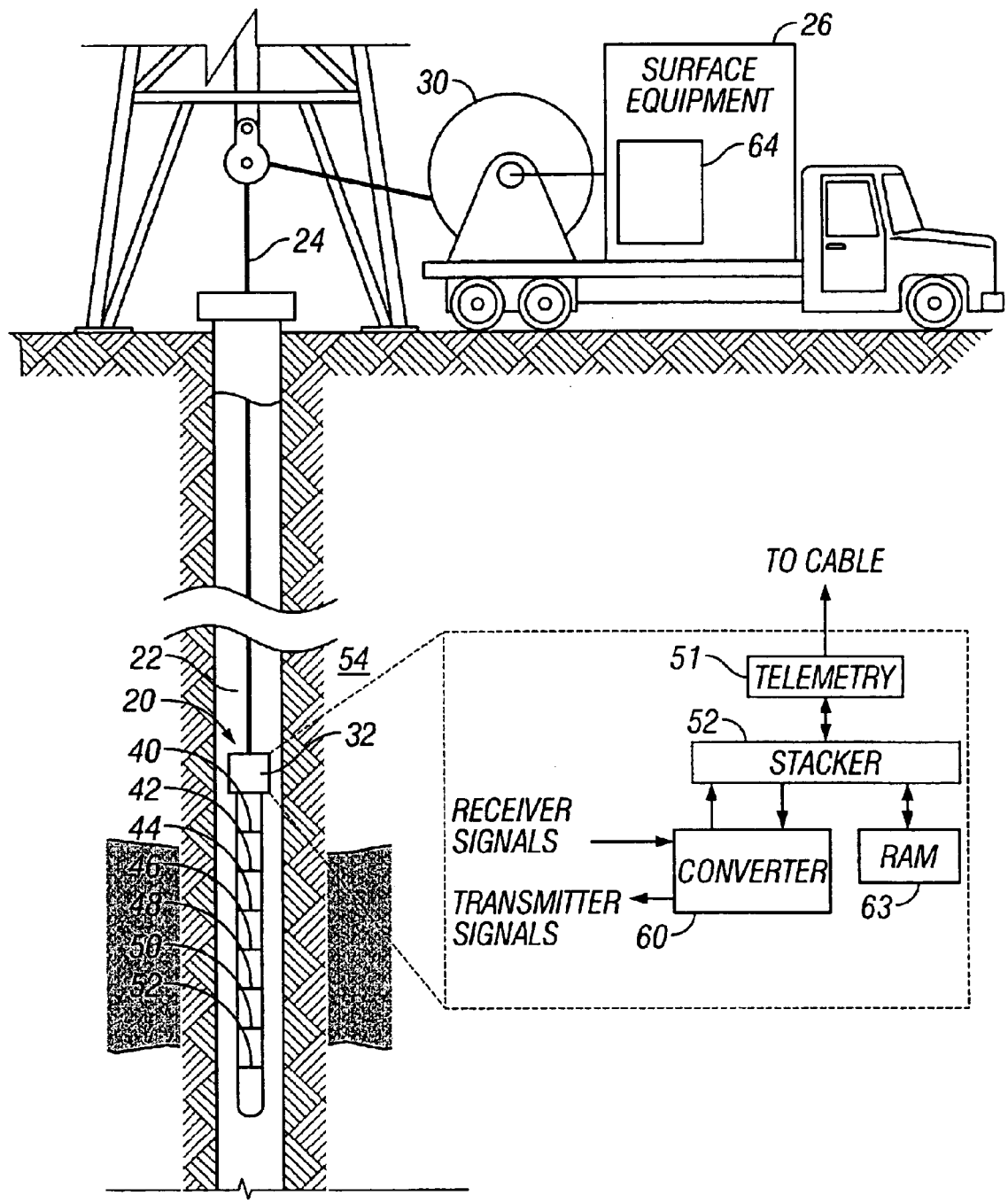
FIG. 1 (prior art) is an illustration showing an induction logging tool positioned in a borehole for measuring the conductivity of the adjacent formation.

Referring now to FIG. 1, an induction logging tool 20 suitable for use in the invention described herein is shown positioned in a borehole 22 penetrating earth formations 54. The tool 20, which is suspended in the borehole 22 by means of a wireline cable 24, includes a borehole sonde 34 and an electronic circuitry section 32. The tool 20 is lowered into the borehole 22 by a cable 24, which preferably passes over a sheave 30 located at the surface of the borehole 22. The cable 24 is typically spooled onto a drum (not shown). The cable 24 includes insulated electric conductors for transmitting electrical signals. The electronic circuitry section 32 of the tool 20 receives signals from the sonde section 34 to perform various analog and digital functions, as will be described later.

The sonde 34 preferably includes a plurality of coils 40–52. Coil 46 is a transmitter coil for transmitting an oscillating signal into the adjacent surrounding geological formation 54. Preferably, a square wave signal is supplied to the coil 46. However, it is contemplated that any of a number of oscillating voltage signals having multiple frequency components can be used. Further, it is desirable that, on occasion, a single-frequency signal, such as a sinusoidal signal, is used. The oscillating voltage signal applied to the coil 46 generates a current in coil 46, which in turn generates an electromagnetic field in the surrounding formation 54. The electromagnetic field, in turn, induces eddy currents, which flow coaxially with respect to the borehole 22. The magnitudes of the eddy currents are proportional to the conductivity of the surrounding formation 54. The remaining coils, 40, 42, 44, 47, 48, 50, and 52 are receiver coils in which signals are induced by the electric fields caused by the eddy currents produced in the formation. As the tool 20 is raised in the borehole 22, the conductivity of the surrounding formation 54 can be determined from the received signals in order that a bed or layer 55 having a conductivity indicative of the possibility of containing hydrocarbons may be located.

The electronic circuitry section 32 includes a converter circuit 60, a stacker circuit 62, a random access memory (RAM) 63, and a telemetry circuit 61. The converter circuit 60 comprises a plurality of pre-amplifiers, filters, and analog-to-digital (A/D) converters for receiving signals from the receiver coils 40–52 and transforming them into digitized signals for further processing by the stacker circuit 62. The analog voltage signals provided by the receiver coils 40–52 are digitally sampled according to a predetermined sampling rate in the period defined by the fundamental frequency of the transmitter signal, which in this embodiment is approximately 10 kHz.

The sampling is repeated over a large number of transmitter voltage signal cycles, such as at least 1,024 cycles, to improve the signal-to-noise ratio of the received signals. To reduce the amount of data that must be stored or transmitted, corresponding digital samples taken in each of the transmitter cycles are summed. The summed digital signal samples corresponding to each of the plurality of receiver coils form corresponding stacked signal samples, which are store in the RAM 63. The stacked signals corresponding to the plurality of receiver coils 40–52 can then be retrieved from the RAM 63 and can be transmitted by the telemetry circuitry 61 through the cable 24 to a computer 64 which forms part of the surface equipment 26, where Fourier analyses of the stacked signals can be performed.

An induction device, such as, for example, High-Definition Induction Log (HDIL), utilizes vertical (z-directed) transmitter and receiver array coils (coil centers are in-line with the tool axis). Therefore, the induced current in near-vertical wells has only a horizontal component, and the induction data contain information related to horizontal resistivity ($R_h$) only. The HDIL is an array-type induction logging tool that collects data at multiple frequencies and various transmitter-receiver spacings. A focusing algorithm converts the HDIL measurements into Vertical Resolution Matched (VRM) logs, which provide estimation of the true $R_h$.

Figure 2:
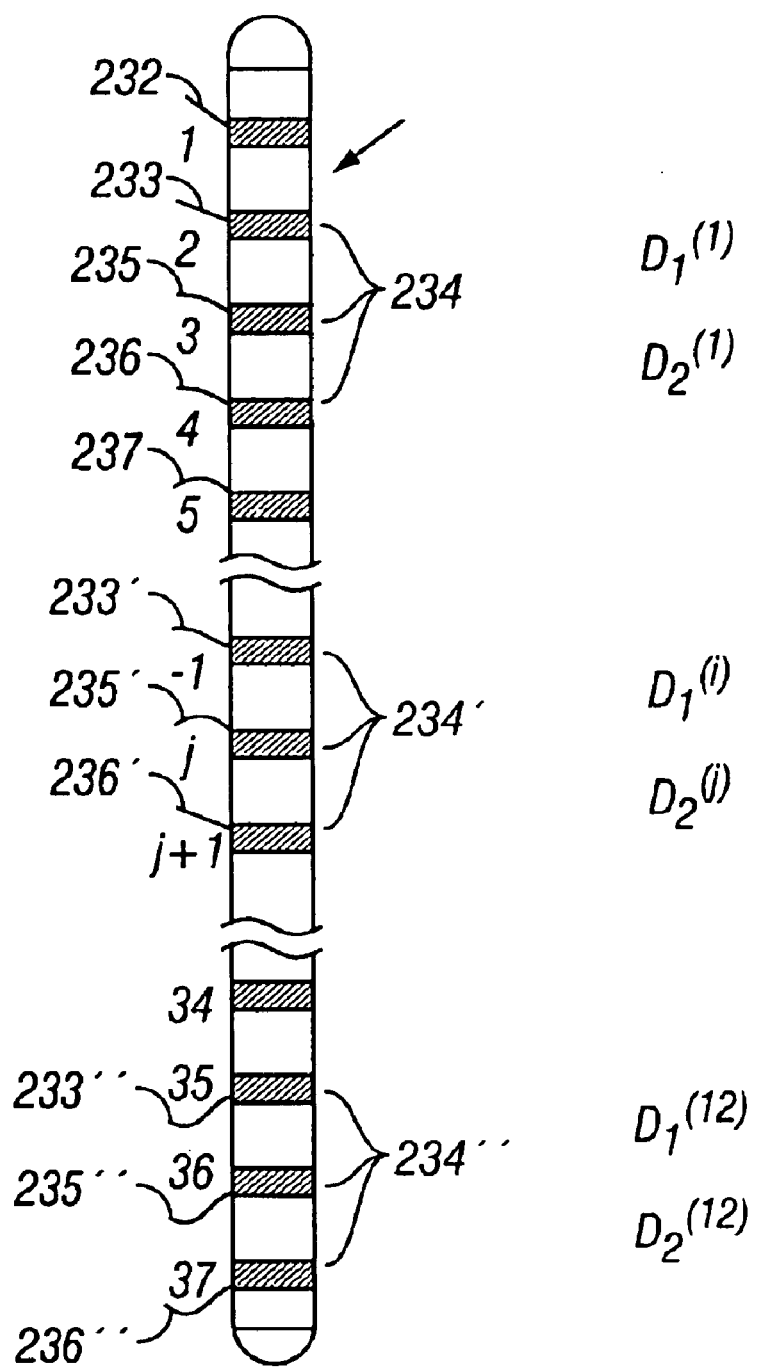
FIG. 2 (prior art) is a side elevational view of one embodiment of the differential lateral array resistivity logging instrument showing the electrode array distribution and relative spacing.

Referring now to FIG. 2, an embodiment of the differential array instrument 10 suitable for use in the invention is shown. One such device, the High-Definition Lateral Log (HDLL), is an array-type, unfocused galvanic logging tool. The HDLL has a single current injection electrode and measures a set of lateral resistivity logs (RL). The instrument 210 has an elongated mandrel or body 212, a single source electrode 232 located near the upper end of the instrument housing, and several groups of identical measuring electrodes 234, 234', and 234" uniformly distributed along the axis of the tool mandrel, which allow for performing a number of measurements at each logging depth as will be hereinafter further described.

In FIG. 2, the instrument 210 includes a mandrel 212 carrying a single source electrode 232 and a plurality of measuring electrodes 233, 235, 236, 237, etc. vertically spaced in equal increments along the axis of the mandrel 212. The number of measuring electrodes chosen for this example is 36, which including the source electrode, makes a total of 37 electrodes which are marked 1–37 in FIG. 2. In the embodiment of FIG. 2, a group 234 of three successive electrodes 233, 235, and 236 are used to obtain measurements, for instance, of first potential difference, $D_1$. For measurement of said first potential difference, the source electrode 232 injects an electrical current of a predetermined value into the formation and it is received by successive lower vertical groups of three electrodes as at 234' and 234". The 36 measuring electrodes produce 12 measurements from successive electrode groups 234, 234', 234", etc. for measuring the first potential differences, thus: at 234-$D_1^{(1)}$, at 234'-$D_1^{(j)}$, and at 234"-$D_1^{(12)}$. Examining the electrode group identified as 234', the first vertically disposed measurement electrode is identified as j−1 (233'), the center electrode is identified as j (235'), and the third or lower electrode is identified as j+1 (236'). The first potential difference $D_1^{(j)}$ is calculated as:

$$D_1^{(j)} = \frac{V_{j+1} - V_{j-1}}{2}.$$

Accordingly, each measurement unit provides first difference $D_1$ at each depth level. The differential conductance is also available at each logging depth.

The anisotropy coefficient ($\lambda$) is defined as a ratio of vertical ($R_v$) over horizontal ($R_h$) resistivity: $\lambda = R_v/R_h$. Since, at each logging depth, the injected current has both horizontal and vertical components, the data contains information related to both $R_h$ and $R_v$. Resistivity values obtained through a lateral logging device can be considered as the mean resistivity R, where $$R = \sqrt{R_h R_v}.$$

Figure 3:
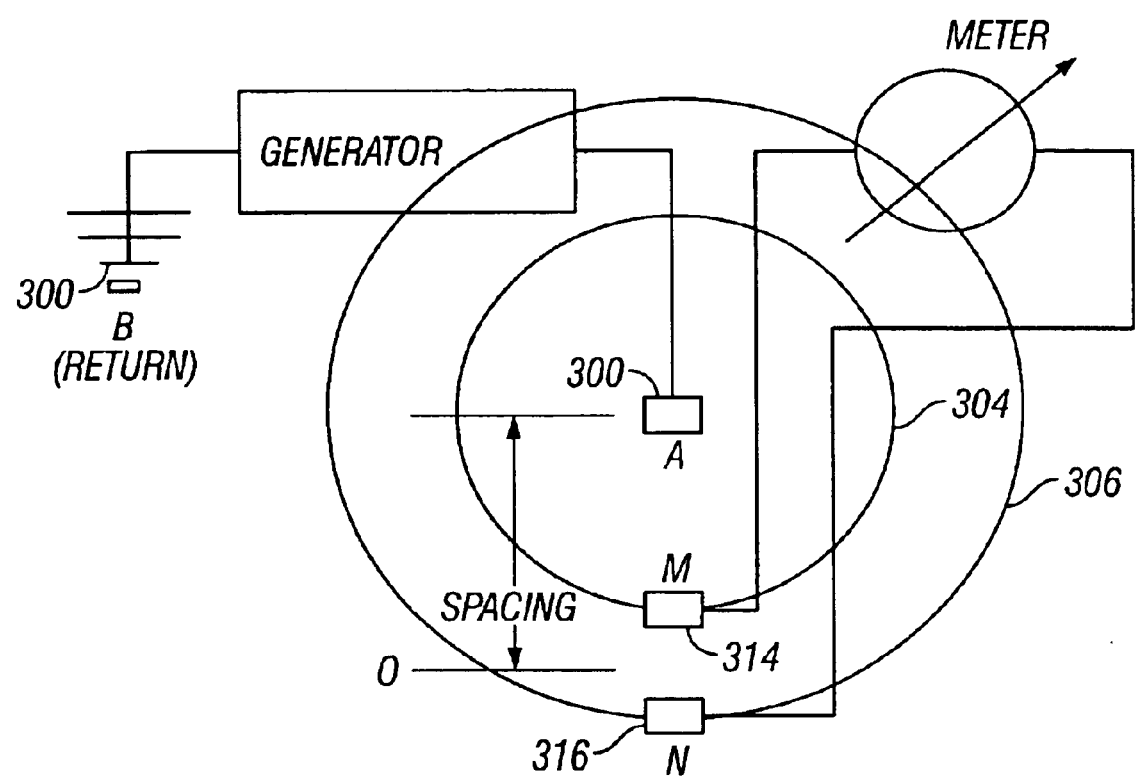
FIG. 3 (prior art) is a schematic of one subarray of the apparatus of FIG. 2.

FIG. 3 shows a schematic of a lateral (unfocused) device or one subarray of the embodiment of FIG. 2 (HDLL). The electrode A (300) is the source, and the electrode B (310) is the return. The return can be located on the surface or far away from the source. The injected current flows radially in the vicinity of the electrode A (300) if the surrounding formation has constant resistivity and is isotropic. The voltage drop between two dashed spheres 304 and 306 is measured by the use of the electrodes M (314) and N (316). In reality, due to the layered structure of the formation and its anisotropic properties, the current has both horizontal and vertical components at any point of the formation.

Figure 4:
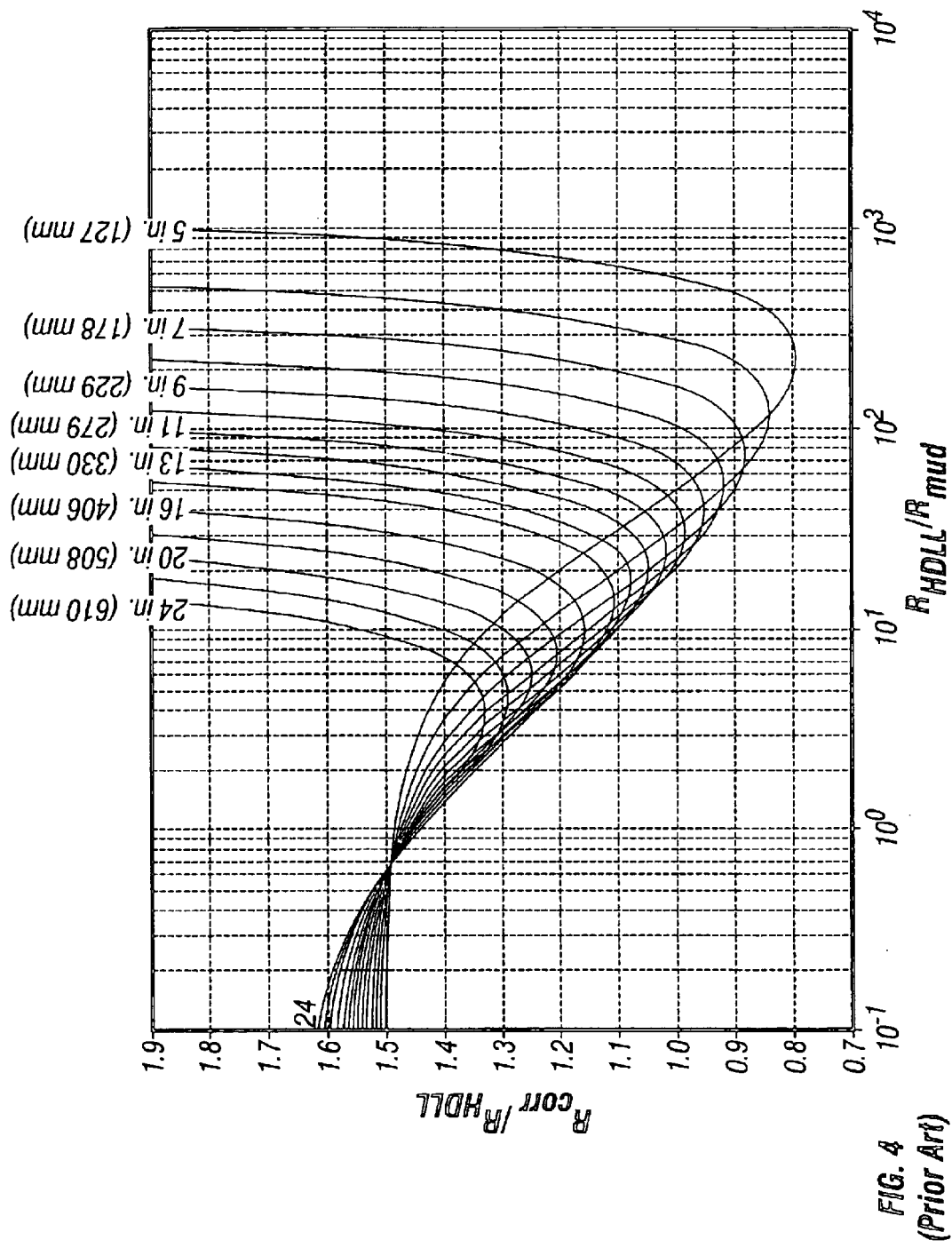
FIG. 4 (prior art) shows borehole size corrections for the method of the apparatus of FIG. 2.

FIG. 4 shows a typical chart of borehole size corrections for an HDLL lateral subarray. To estimate anisotropy in real-time, it is possible to perform borehole corrections of the RL (HDLL) and VRM (HDIL) logs using such precalculated correction charts. Having the two corrected logs, we then instantly estimate the formation anisotropy using a ratio between the RL and VRM logs. The calculations are performed at each logging point to provide a continuous anisotropy log.

Figure 5A:
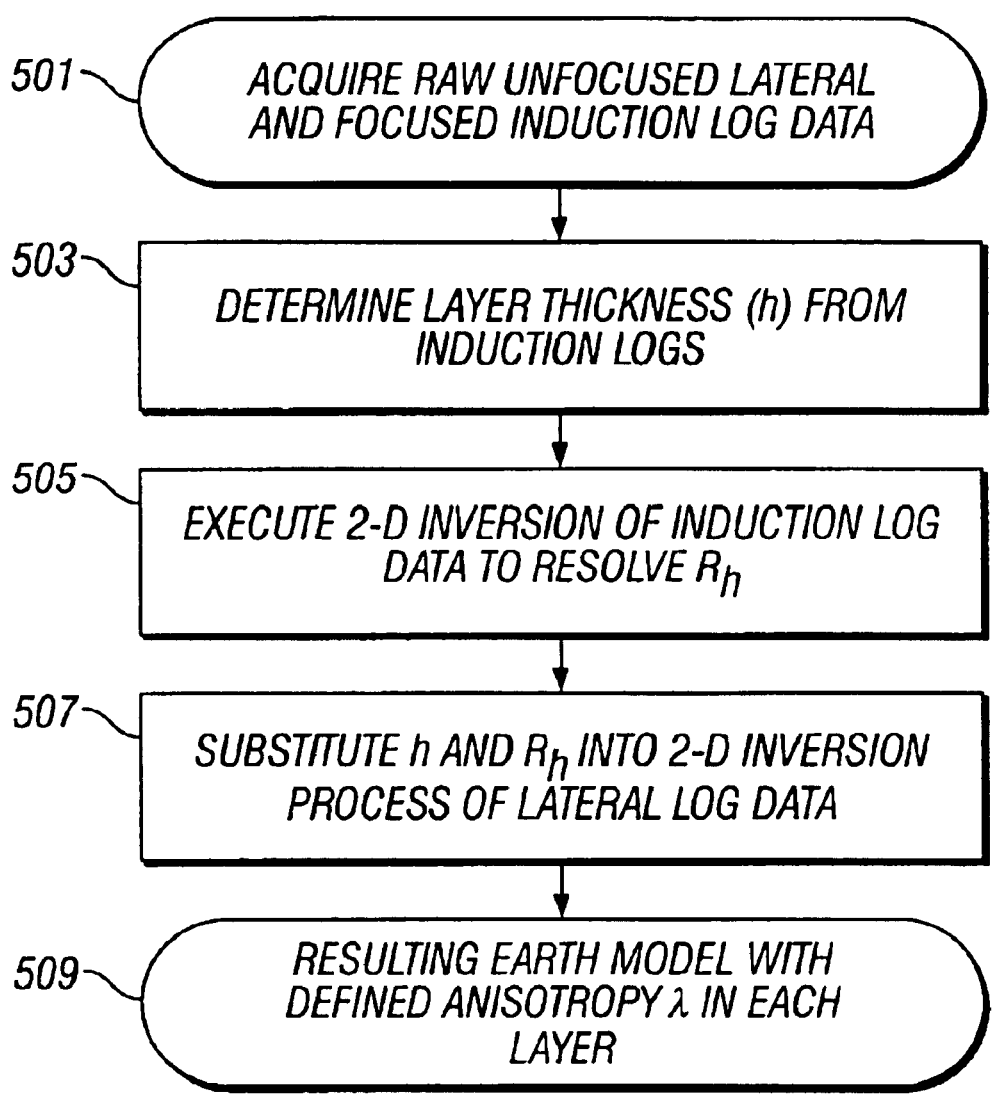
FIG. 5a (prior art) is a flowchart of a method of anisotropy determination used in prior art.

A method disclosed by Yang (2001) "Determining resistivity anisotropy by joint lateral and induction logs", SPWLA 42$^{nd}$ Annual Logging Symposium, paper CC) is shown in FIG. 5a. Yang obtains a value of resistivity anisotropy using unfocused lateral log and focused induction log data. Raw unfocused lateral log data and focused induction log data are acquired (box 501). From the induction log data, the interpreter can determine a value for formation thickness, h (box 503). This value of thickness can be used in a 2-D inversion of induction log data (box 505) to determine a value of horizontal resistivity ($R_h$). This inversion eliminates mud and shoulder-bed effects. Values of horizontal resistivity and formation thickness obtained can then be substituted into an inversion of lateral log data (box 507). This results in a value for formation resistivity anisotropy, $\lambda$ (box 509).

Figure 5B:
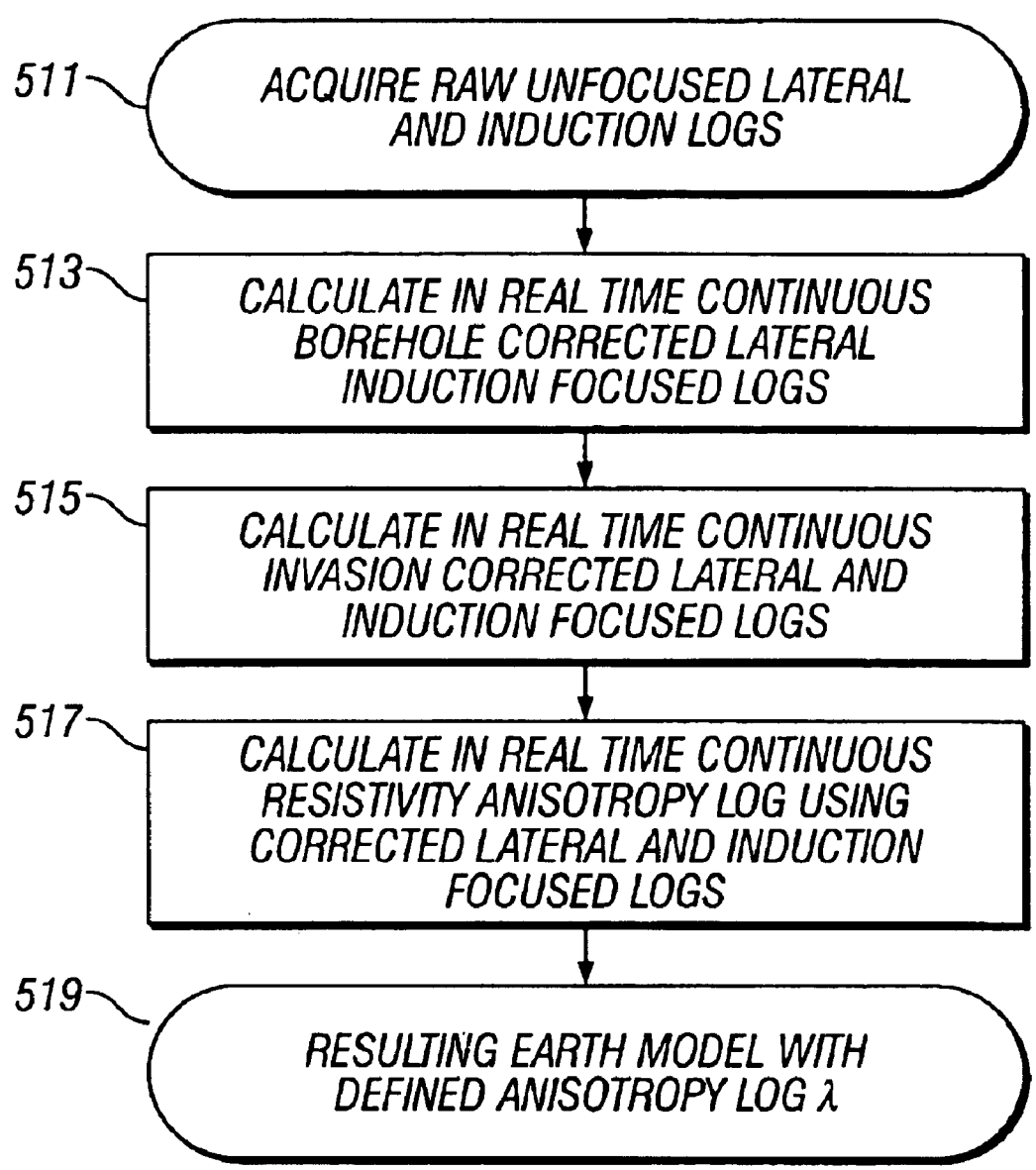
FIG. 5b is a flowchart of the method of anisotropy determination of the invention.

The real-time anisotropy estimation process of the present invention is outlined in the diagram of FIG. 5b. Raw data is obtained from the unfocused lateral log (HDLL) and from the array induction log (HDIL), as shown in box 511. In box 513, both lateral and induction logs are calculated having corrections for borehole effects. Borehole effects can be determined from results such as those shown in FIG. 4 (HDLL) or from Zhang '542 (HDIL). Borehole corrections can be applied on a point-by-point basis. In box 515, calculations are made to correct both the lateral and induction logs for invasion effects. In case of a significant effect of invasion, an auxiliary Microlaterolog (MLL) data is required to perform a proper invasion correction. Calculation of a continuous resistivity anisotropy log is performed next in box 517 using the following formula:

$$\lambda = \frac{\sqrt{R_h R_v}}{R_h} = \sqrt{\frac{R_v}{R_h}}$$

In the method of the present invention, the value of mean resistivity $\sqrt{R_h R_v}$ is the value obtained from corrected laterolog values (HDLL) of box 515 and the value of horizontal resistivity $R_h$ is the value obtained from corrected induction tool values (HDIL) of box 515. The calculations performed in box 517 result in an anisotropic Earth model (box 519). Thus, using the method of the present invention, parameters of interest such as the horizontal and vertical resistivities and anisotropy factors can be determined at a plurality of depths. The method of the present invention should furnish reasonable anisotropy estimates in thick sand/shale formations where the shoulder bed effects are small.

This method of the present invention does not use an inversion as in Yang. Corrections for borehole (box 513) and invasion (box 515) are made without inversion. In Yang, invasion and borehole effects are corrected for via the inversion of the induction log data (box 505). Since the method of the present invention does not use an inversion process, said method increases computation speed and operational reliability over methods, such as those used in Yang, which uses an inversion process. Also, the method of the present invention enables a point-by-point calculation of anisotropy. Calculations made by inversion processes in prior art, such as in Yang, are confined to formation layers.

The method described with reference to FIG. 5b can be simplified and accelerated. As before, we get $R_h$ from the deep reading borehole corrected induction focused logs (VRM). Then, instead of determining a mean resistivity from the lateral logs, a chart based log correction for the borehole and, if necessary, invasion effects, is applied. This method should thus furnish reasonable anisotropy estimates in thick sand/shale formations where the shoulder bed effects are small.

Figure 6:
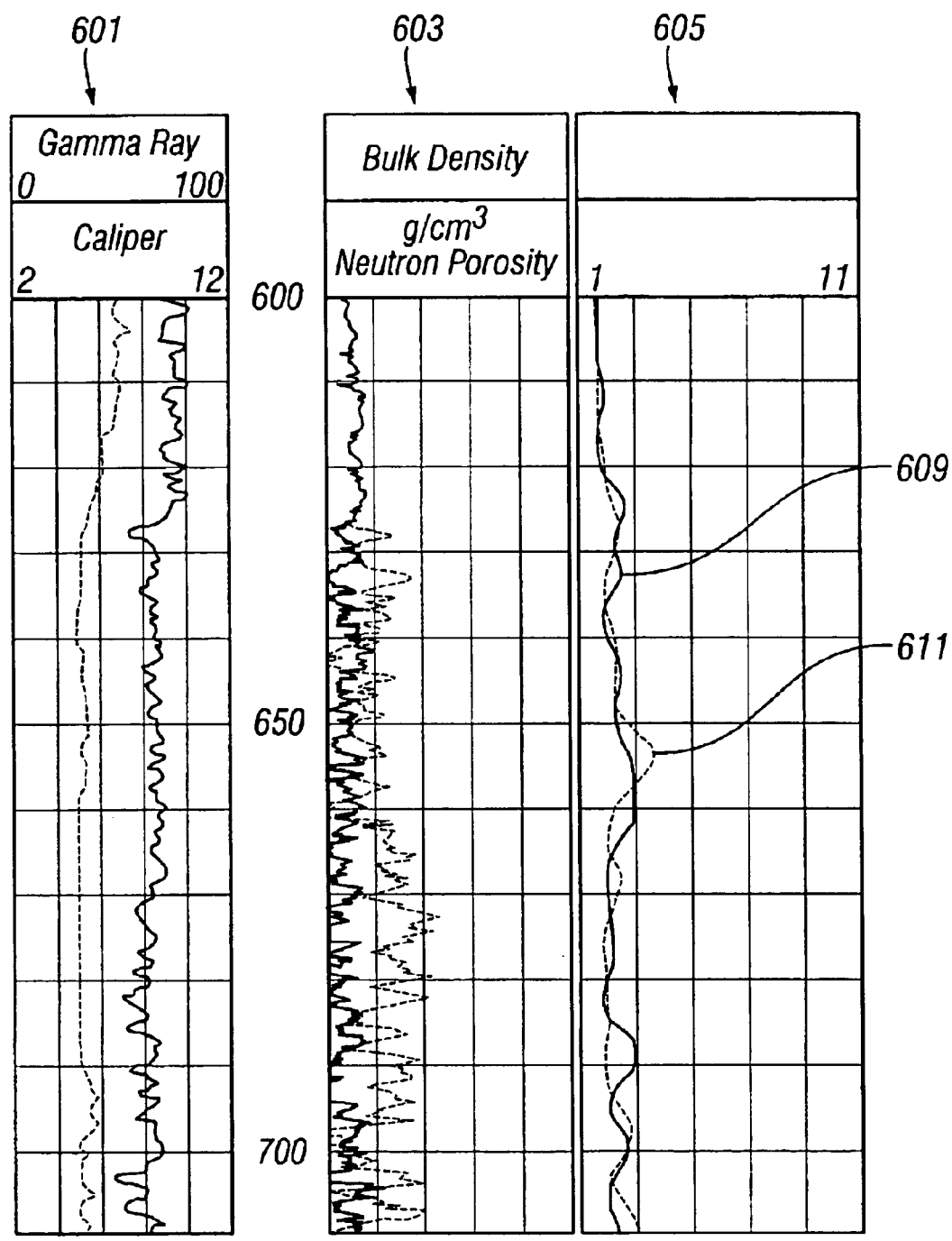
FIG. 6 is a field example of the method of the invention tested against anisotropy derived from the multicomponent induction data.

FIG. 6 shows an example of real-time anisotropy estimation using array laterolog (HDLL) and array induction (HDIL) measurements acquired in a vertical offshore well in the Mediterranean region. This field example is used to evaluate the accuracy of the suggested real-time anisotropy estimation method of the present invention by comparing its results with the results of anisotropy estimation acquired in the same well through use of a multi-array resistance measuring device, known as 3DEX$^{SM}$. 3DEX$^{SM}$ is discussed in U.S. patent application Ser. No. 10/091,310 by Zhang et al., having the same assignee as the present application. The 3DEX$^{SM}$ device contains three transmitters and three receivers directed along orthogonal axes (x,y,z) with the z-component along the longitudinal axis of the drilling tool.

FIG. 6 shows the results of using the two methods of the present invention described above in comparison with inversion of 3DEX data. Track 1 601 shows the caliper and gamma ray data. Track 2 603 shows the density and neutron logs. 609 in track 3 605 shows the results obtained using the method described above with reference to FIG. 5*b*. 611 of track 3 shows the results obtained by inversion of 3DEX data. As can be seen, there is reasonable agreement between 609 and 611.

Figure 7:
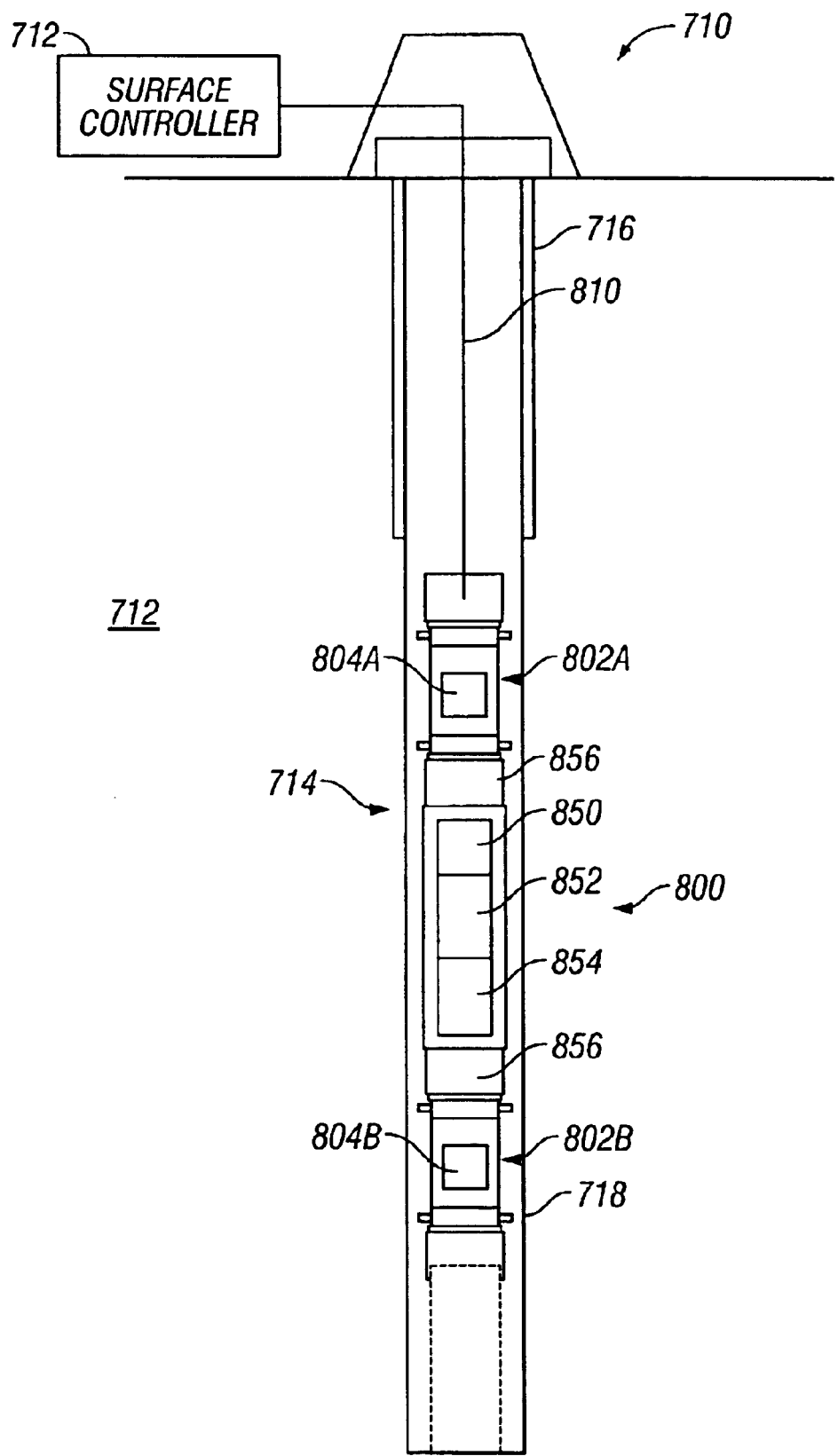
FIG. 7 shows a configuration of tools suitable for use with the method of the present invention.

An exemplary configuration of tools for use with the present invention is shown in FIG. 7. Shown in the figure is a rig 710 on the surface that is positioned over a subterranean formation of interest 712. The rig 710 can be a part of a land or offshore a well production/construction facility. A wellbore 714 formed below the rig 710 includes a cased portion 716 and an open hole portion 718. In certain instances (e.g., during drilling, completion, work-over, etc.), a logging operation is conducted to collect information relating to the formation 712 and the wellbore 714. Typically, a tool system 800 is conveyed downhole via a wireline 810 to measure one or more parameters of interest relating to the wellbore 714 and/or the formation 712. The tool system 800 can include one or more modules 802*a,b*, each of which has a tool or a plurality of tools 804*a,b*, adapted to perform one or more downhole tasks. For use with the present invention, these modules could include, e.g., a differential array resistivity device and an induction logging device. The term "module" should be understood to be a device such as a sonde or sub that is suited to enclose, house, or otherwise support a device that is to be deployed into a wellbore. While two modules 802*a,b* and two associated tools 804*a,b*, are shown, it should be understood that a greater or fewer number may be used.

In certain embodiments, the tool system 800 can include telemetry equipment 850, a local or downhole controller 852 and a downhole power supply 854. The telemetry equipment 850 provides two-way communication for exchanging data signals between a surface controller 812 and the tool system 800 as well as for transmitting control signals from the surface processor 812 to the tool system 800. The processing of the data may be done entirely downhole, entirely uphole, or a combination of the two. It should further be noted that while the string of tools shown in FIG. 7 is conveyed on a wireline, conveyance may be done by coiled tubing in near horizontal wellbores.

With relatively minor modifications, the present invention may also be used in Measurement-While-Drilling (MWD) applications wherein the sensor modules are conveyed downhole on a drilling tubular such as a drillstring or coiled tubing.

While the foregoing disclosure is directed to the preferred embodiments of the invention, various modifications will be apparent to those skilled in the art. While specific embodiments of the microresistivity tool and induction logging tool have been discussed above, it is to be understood that the tools may be used either on a wireline or in an MWD environment. It is to be further understood that the anisotropy measurements discussed above with reference to an induction logging tool may also be obtained using a propagation resistivity tool. It is intended that all variations within the scope and spirit of the appended claims be embraced by the foregoing disclosure.

What is claimed is:

1. A method of determining a resistivity parameter of interest of an anisotropic earth formation, the method comprising:

(a) obtaining a plurality of unfocused differential array resistivity measurements (lateral log) over a depth interval;

(b) obtaining a plurality of induction resistivity measurements with an induction logging tool over said depth interval;

(c) processing said plurality of unfocused differential array resistivity measurements and said plurality of induction resistivity measurements and obtaining therefrom said parameter of interest, said processing excluding an inversion of said induction resistivity measurements.

2. The method of claim 1 wherein said parameter of interest comprises a mean resistivity of said earth formation.

3. The method of claim 1 wherein said parameter of interest comprises a vertical resisitivy of said earth formation.

4. The method of claim 1 wherein said parameter of interest comprises a horizontal resistivity of said earth formation.

5. The method of claim 1 wherein said plurality of induction measurements comprises focused measurements.

6. The method of claim 1 wherein said processing further comprises applying a borehole correction and an invasion correction to said lateral log.

7. The method of claim 1 wherein said processing further comprises applying a borehole correction and an invasion correction to said induction log and obtaining a horizontal resistivity.

8. The method of claim 7 further comprising determining an anisotropy factor from a mean resistivity and a horizontal resistivity.

9. The method of claim 1 further comprising making measurements with a micro-laterolog and using said micro-laterolog measurements in said processing.

10. An apparatus for use in a borehole in an anisotropic earth formation for determining a resistivity parameter of said earth formation, the apparatus comprising:

(a) an unfocused differential array resistivity measuring device for obtaining a a plurality of unfocused differential resistivity measurements (lateral log) over a depth interval;

(b) an induction resistivity measuring device for obtaining a plurality of induction resistivity measurements over said depth interval;

(c) a processor for processing said plurality of unfocused differential array resistivity measurements and said plurality of induction resistivity measurements and obtaining therefrom obtaining said parameter of interest, said processing excluding an inversion of said induction resistivity measurements.

11. The apparatus of claim 10 wherein said parameter of interest comprises a vertical resistivity of said earth formation.

12. The apparatus of claim 10 wherein said parameter of interest comprises a horizontal resistivity of said earth formation.

13. The apparatus of claim 10 wherein said plurality of induction measurements comprises focused measurements.

14. The apparatus of claim 10 wherein said processor further applies a borehole correction and an invasion correction to said lateral log.

15. The apparatus of claim 14 wherein said processor further comprises applies a borehole correction and an invasion correction to said induction log and obtains a horizontal resistivity.

16. The apparatus of claim 15 wherein said processor further determines an anisotropy factor from a mean resistivity and said horizontal resistivity.

17. The apparatus of claim 10 further comprising making measurements with a micro-laterolog and using said micro-laterolog measurements in said processing.

18. The apparatus of claim 10 wherein said processor performs said processing substantially in real time.

19. The apparatus of claim 10 wherein said processor is at a surface location.

20. The apparatus of claim 10 wherein said processor is at a downhole location.

21. The apparatus of claim 10 wherein said induction resistivity device is an array device.

22. The apparatus of claim 10 wherein said induction resistivity device comprises a plurality of coils with an axis substantially parallel to an axis of said resistivity device.

23. A system for use in a borehole in an anisotropic earth formation for determining a resistivity parameter of said earth formation, the system comprising:
    (a) an unfocused differential array resistivity measuring device for obtaining a a plurality of unfocused differential resistivity measurements (lateral log) over a depth interval;
    (b) an induction resistivity measuring device for obtaining a plurality of induction resistivity measurements over said depth interval;
    (c) a processor for processing said plurality of unfocused differential array resistivity measurements and said plurality of induction resistivity measurements and obtaining therefrom obtaining said parameter of interest, said processing excluding an inversion of said induction resistivity measurements; and
    (d) conveyance device for conveying said unfocused differential array resistivity measuring device and said induction resistivity device into said borehole.

24. The system of claim 23 wherein said conveyance device comprises a wireline.

25. The system of claim 23 wherein said conveyance device comprises coiled tubing.

26. The system of claim 23 wherein said conveyance device comprises a drilling tubular.

27. The system of claim 23 wherein said processor is at a surface location.

28. The system of claim 23 wherein said processor is at a downhole location.

29. The system of claim 23 wherein said induction device comprises coils with axes substantially parallel to an axis of the borehole.

* * * * *